(12) United States Patent
Shao (10) Patent No.: US 9,971,944 B2
(45) Date of Patent: May 15, 2018

(54) UNSTRUCTURED ROAD BOUNDARY DETECTION

(71) Applicant: Harman International Industries, Incorporated, Stamford, CT (US)

(72) Inventor: Xisheng Shao, Jiangsu (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days. days.

(21) Appl. No.: 14/909,951

(22) PCT Filed: Aug. 23, 2013

(86) PCT No.: PCT/CN2013/082193
§ 371 (c)(1),
(2) Date: Feb. 3, 2016

(87) PCT Pub. No.: WO2015/024257
PCT Pub. Date: Feb. 26, 2015

(65) Prior Publication Data
US 2016/0171314 A1    Jun. 16, 2016

(51) Int. Cl.
*G06K 9/00* (2006.01)
*G06K 9/34* (2006.01)
(Continued)

(52) U.S. Cl.
CPC .......... *G06K 9/00798* (2013.01); *G06K 9/342* (2013.01); *G06K 9/42* (2013.01);
(Continued)

(58) Field of Classification Search
CPC ...... G06K 9/00798; G06K 9/481; G06K 9/42; G06K 9/4652; G06K 9/342; G06T 7/181;
(Continued)

(56) References Cited

U.S. PATENT DOCUMENTS 5,307,419 A * 4/1994 Tsujino ................ G05D 1/0223
348/119
6,590,521 B1 * 7/2003 Saka ...................... G01S 13/931
180/167
(Continued)

FOREIGN PATENT DOCUMENTS

CN          101950415 A       1/2011

OTHER PUBLICATIONS

International Search Report dated Jun. 11, 2014 in Application No. PCT/CN2013/082193.
(Continued)

*Primary Examiner* — Aaron W Carter
(74) *Attorney, Agent, or Firm* — Artegis Law Group, LLP (57) ABSTRACT

A method for determining a road region may include: obtaining a color image; selecting a candidate road region within the color image according to a road model; identifying a seed pixel from the candidate road region; obtaining a brightness threshold and a color threshold, where the brightness threshold and the color threshold are determined according to brightness distances and color distances from pixels in the candidate road region to the seed pixel; and performing road segmentation by determining whether the pixels in the candidate road region belong to a road region based on the brightness threshold and the color threshold.

16 Claims, 4 Drawing Sheets

(51) Int. Cl.
*G06K 9/46* (2006.01)
*G06K 9/42* (2006.01)
*G06K 9/48* (2006.01)
*G06T 7/11* (2017.01)
*G06T 7/12* (2017.01)
*G06T 7/143* (2017.01)
*G06T 7/181* (2017.01)
*G06T 7/136* (2017.01)

(52) U.S. Cl.
CPC .......... *G06K 9/4652* (2013.01); *G06K 9/481* (2013.01); *G06T 7/11* (2017.01); *G06T 7/12* (2017.01); *G06T 7/136* (2017.01); *G06T 7/143* (2017.01); *G06T 7/181* (2017.01); *G06T 2207/10024* (2013.01); *G06T 2207/30256* (2013.01)

(58) Field of Classification Search
CPC ........... G06T 7/136; G06T 7/143; G06T 7/12; G06T 7/11; G06T 2207/10024; G06T 2207/30256
USPC ........ 382/104, 103, 153, 159, 199; 180/167, 180/169; 315/82; 340/468, 457.2, 930, 340/933; 342/70; 348/113, 116, 119, 348/148, 439, E7.085; 356/437; 701/408; 703/2
See application file for complete search history.

(56) References Cited

U.S. PATENT DOCUMENTS

| | | | |
|---|---|---|---|
| 6,658,137 B1 * | 12/2003 | Yuhara | B60R 16/0237 382/104 |
| 7,936,903 B2 * | 5/2011 | Ekin | G06K 9/00791 250/330 |
| 8,120,652 B2 * | 2/2012 | Bechtel | B60Q 1/1423 348/113 |
| 8,340,896 B2 * | 12/2012 | Saito | B60W 40/072 340/438 |
| 8,699,754 B2 * | 4/2014 | Zhang | G06K 9/00798 348/116 |
| 2009/0010494 A1 | 1/2009 | Bechtel et al. | |
| 2009/0074250 A1 | 3/2009 | Takahashi et al. | |

OTHER PUBLICATIONS

Sotelo, Miguel Angel et.al. "A color Vision-Based Lane Tracking System for Autonomous Driving on Unmarked Roads." Autonomous Robots. Jan. 31, 2004 (Jan. 31, 2004) Issue L vol. 16, pp. 95-114, figures 1-30.

Yin, Jian xin et.al. "Measurement Aritlunetic for Unstructured Road Based on Boundary and Region." Computer Engineering. Aug. 31, 2008 (Aug. 31, 2008), No. 15, vol. 34, ISSN I000-3428, the whole document.

Guo, Chun Zhao et.al. "Drivable Road Boundary Detection for Intelligent Vehicles Based on Stereovision with Plane-induced Homography." ACT A Automatica Sinica. Apr. 30, 2013(Apr. 30, 2013), No. 4, ISSN 0254-4156, the whole document.

Extended European Search Report for Application No. EP 13891976.6, dated Apr. 10, 2017, 10 pages.

Smolka et al., "Fast Modified Vector Median Filter", Electrical and Computer Engineering, 2001, Canadian Conference on May 13-16, 2001, vol. 2, Jan. 1, 2001, XP0555360903, 11 pages.

Bardos et al., "Selective Vector Median Filtering of Colour Images", Image Processing and Its Applications, 1997, Sixth International Conference on Dublin, Ireland, Jul. 14-17, 1997, London, UK, vol. 2, Jul. 14, 1997, XP006508386, pp. 708-711.

Vardavoulia et al., "A new vector median filter for colour image processing", Pattern Recognition Letters, Elsevier, Amsterdam, NL, vol. 22, No. 6-7, May 1, 2001, XP004234808, pp. 675-689.

Derek Robin Charles, "Chapter 4—Local window methods of noise removal" In: "Algorithmic and learning based filtering techniques with application to colour image noise suppression and enhancement", Jan. 1, 2003, University of London, Cambridge, Mass, XP055360935, pp. 57-91.

Ligong, et al. "An Improving Vector Median Filter for Color Image", China Academic Journal Electronic Publishing House, Computer Engineering, vol. 27, No. 6, Jun. 2001, 3 pages.

* cited by examiner

UNSTRUCTURED ROAD BOUNDARY DETECTION

CROSS-REFERENCE TO RELATED APPLICATIONS

The present application is a national stage application of the international application titled, "UNSTRUCTURED ROAD BOUNDARY DETECTION," filed on Aug. 23, 2013 and having application number PCT/CN2013/082193. The subject matter of this related application is hereby incorporated herein by reference.

TECHNICAL FIELD

The present disclosure generally relates to unstructured road boundary detection.

BACKGROUND

Road boundary detection plays an important role in the autonomous vehicle technology. Unstructured road lacks clearly defined features in an image, which challenges the conventional edge-based approaches.

SUMMARY

In one embodiment, a method for detecting unstructured road boundary is provided. The method may include: obtaining a color image; selecting a candidate road region within the color image according to a road model; identifying a seed pixel from the candidate road region; obtaining a brightness threshold and a color threshold, where the brightness threshold and the color threshold are determined according to brightness distances and color distances from pixels in the candidate road region to the seed pixel; and performing road segmentation by determining whether the pixels in the candidate road region belong to a road region based on the brightness threshold and the color threshold.

In some embodiments, the method may further include preprocessing the obtained color image, which may include:

sampling the color image using a sampling frame which has a predetermined height and a predetermined width;

calculating norms of vectors, which respectively correspond to pixels in the sampling frame, where each of the vectors represents a line pointing from an original point to a point corresponding to a pixel in a color space;

identifying a first predetermined number of vectors by filtering out a first number of vectors having the maximum norms of vectors and a second number of vectors having the minimum norms of vectors;

obtaining a weighted average vector, where a $m^{th}$ component of the weighted average vector may be obtained by calculating weighted average of $m^{th}$ components of the first predetermined number of vectors;

calculating norms of differences between the first predetermined number of vectors and the weighted average vector;

identifying, from the first predetermined number of vectors, a second predetermined number of vectors which may have the minimum norms of differences with the weighted average vector; and obtaining median vectors based on the second predetermined number of vectors, to obtain a preprocessed color image, where the candidate road region may be selected within the preprocessed color image.

In some embodiments, a vector median filtering algorithm may be used to obtain the median vectors based on the second predetermined number of vectors.

In some embodiments, a weight value for a $m^{th}$ component of the first predetermined number of vectors is determined based on a distance between a pixel corresponding to the $m^{th}$ component of the first predetermined number of vectors and the center position of the sampling frame, and the greater the distance, the higher the weight value.

In some embodiments, a brightness threshold $T_{achrom}$ and a color threshold $T_{chrom}$ may be obtained according to the following equations, respectively $$d_{chrom-rms-i} = \sqrt{\frac{1}{M}\sum_{j=1}^{M} d_{jchrom-i}^2}$$

$$d_{int-rms-i} = \sqrt{\frac{1}{M}\sum_{j=1}^{M} d_{jint-i}^2}$$

$$T_{chrom} = K d_{chrom-rms-i}$$

$$T_{achrom} = K d_{int-rms-i}$$

where M represents the number of pixels in the candidate road region; $d_{jchrom-i}$ represents a color distance between a pixel j and the seed pixel, $d_{jint-i}$ represents an absolute value of a brightness distance between a pixel j and the seed pixel; $d_{chrom-rms-i}$ represents the root-mean-square value of the color distance between M pixels and the seed pixel, $d_{int-rms-i}$ represents the root-mean-square value of the brightness distance between M pixels and the seed pixel, and K represents an empirical parameter.

In some embodiments, determining whether pixels in the candidate road region belong to a road region may include:

obtaining a spatial distance between a pixel of bright color and the seed pixel;

comparing the spatial distance with the color threshold; and determining whether the pixel of bright color belongs to a road region according to the comparison;

where the spatial distance between the pixel and the seed pixel is calculated according to the following equations:

$$d(i, j) = \sqrt{(d_I)^2 + (d_c)^2}$$

$$d_I = |I_i - I_j|$$

$$d_c = \sqrt{(S_i)^2 + (S_j)^2 - 2S_iS_j\cos\theta}$$

$$\theta = \begin{cases} |H_i - H_j| & \text{if } |H_i - H_j| < 180° \\ 360° - |H_i - H_j| & \text{if } |H_i - H_j| > 180° \end{cases}$$

where d(i, j) represents the spatial distance between a pixel j and the seed pixel i; $d_c$ represents a color distance between the pixel j and the seed pixel i in a two-dimensional color plane; $d_I$ represents the absolute value of a brightness distance between the pixel j and the seed pixel i; and $\theta$ represents a tone difference of the pixel j and the seed pixel i in the color plane; $H_i$ and $H_j$ represent hue components of the seed pixel i and the pixel j in HSI color space, respectively; $S_i$ and $S_j$ represent saturation components of the seed pixel i and the pixel j in HSI color space, respectively; $I_i$ and $I_j$ represent brightness components of the seed pixel i and the pixel j in HSI color space, respectively.

In some embodiments, determining whether pixels in the candidate road region belong to a road region may include:

obtaining a brightness distance between a pixel of dim color and the seed pixel;

comparing the brightness distance with the brightness threshold;

determining whether the pixel of dim color belongs to a road region according to the comparison;

where the brightness distance between the pixel j of dim color and the seed pixel i is calculated according to equation: $d_i = I_i - I_j$ where $I_i$ and $I_j$ represent brightness components of the seed pixel i and the pixel j in HSI color space, respectively.

In some embodiments, the method may further include determining whether the road model matches an unstructured road which is included in the color image based on a road segmentation result.

In some embodiments, determining whether the road model matches the unstructured road based on the road segmentation result may include: calculating a percentage between the number of pixels in a region according to the road segmentation result coinciding with pixies in a corresponding region in a color image, and the number of all pixels in the corresponding region in the color image; and if the percentage is greater than a predetermined value, determining that the selected road model matches the unstructured road. In some embodiments, the coincidence of pixels means that one pixel may have its values of hue, saturation and brightness substantially equal to another pixel.

In some embodiments, a predetermined value may range from 85% to 90%.

In one embodiment, a system for detecting an unstructured road boundary is provided. The system may include: a camera; and a processing device configured to: select a candidate road region within a color image captured by the camera according to a road model; identify a seed pixel from the candidate road region; obtain a brightness threshold and a color threshold, where the brightness threshold and the color threshold are determined according to brightness distances and color distances from pixels in the candidate road region to the seed pixel; and perform road segmentation by determining whether the pixels in the candidate road region belong to a road region based on the brightness threshold and the color threshold.

In some embodiments, the processing device may be further configured to:

sample the color image using a sampling frame which has a predetermined height and a predetermined width;

calculate norms of vectors, which respectively correspond to pixels in the sampling frame, where each of the vectors represents a line pointing from an original point to a point corresponding to a pixel in a color space;

identify a first predetermined number of vectors by filtering out a first number of vectors having the maximum norms of vectors and a second number of vectors having the minimum norms of vectors;

obtain a weighted average vector, where a $m^{th}$ component of the weighted average vector may be obtained by calculating weighted average of $m^{th}$ components of the first predetermined number of vectors;

calculate norms of differences between the first predetermined number of vectors and the weighted average vector;

identify, from the first predetermined number of vectors, a second predetermined number of vectors which may have the minimum norms of differences with the weighted average vector; and obtain median vectors based on the second predetermined number of vectors, to obtain a preprocessed color image, where the candidate road region may be selected within the preprocessed color image.

In some embodiments, a vector median filtering algorithm may be used to obtain the median vectors based on the second predetermined number of vectors.

In some embodiments, a weight value for a $m^{th}$ component of the first predetermined number of vectors may be determined based on a distance between a pixel corresponding to the $m^{th}$ component of the first predetermined number of vectors and the center position of the sampling frame.

In one embodiment, a system for detecting an unstructured road boundary is provided. The system may include: means for obtaining a color image; means for selecting a candidate road region within the color image according to a road model; means for identifying a seed pixel from the candidate road region; means for obtaining a brightness threshold and a color threshold, where the brightness threshold and the color threshold are determined according to brightness distances and color distances from pixels in the candidate road region to the seed pixel, respectively; and means for performing road segmentation by determining whether the pixels in the candidate road region belong to a road region based on the brightness threshold and the color threshold.

In one embodiment, an image processing method is provided. The image processing method may include: sampling the color image using a sampling frame which has a predetermined height and a predetermined width; calculating norms of vectors, which respectively correspond to pixels in the sampling frame, where each of the vectors represents a line pointing from an original point to a point corresponding to a pixel in a color space; identifying a first predetermined number of vectors by filtering out a first number of vectors having the maximum norms of vectors and a second number of vectors having the minimum norms of vectors; obtaining a weighted average vector, where a $m^{th}$ component of the weighted average vector may be obtained by calculating weighted average of $m^{th}$ components of the first predetermined number of vectors; calculating norms of differences between the first predetermined number of vectors and the weighted average vector; identifying, from the first predetermined number of vectors, a second predetermined number of vectors which may have the minimum norms of differences with the weighted average vector; and obtaining median vectors based on the second predetermined number of vectors, to obtain a preprocessed color image, where the candidate road region may be selected within the preprocessed color image.

In some embodiments, a vector median filtering algorithm may be used to obtain median vectors based on the second predetermined number of vectors.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Figure 1:
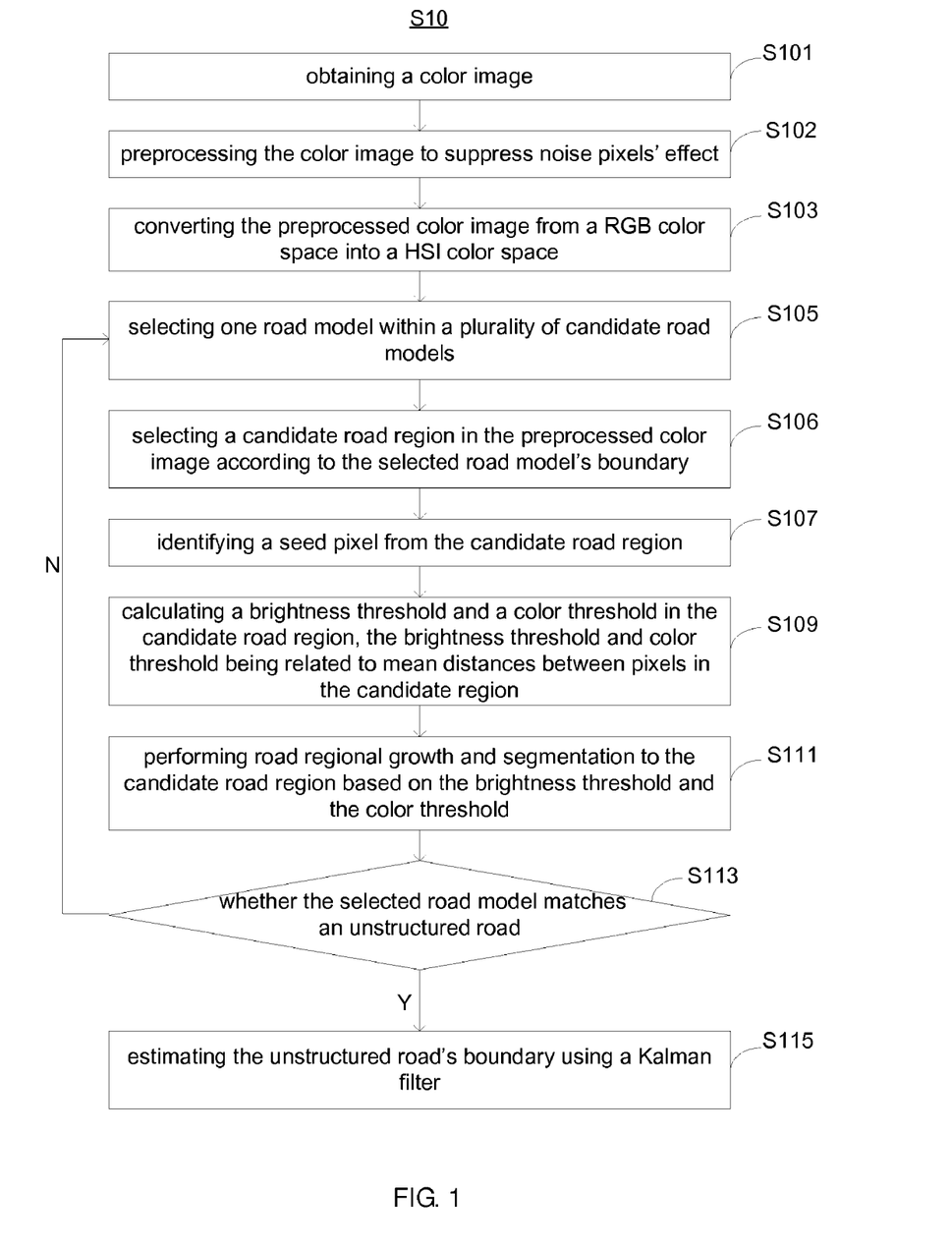
FIG. 1 illustrates a schematic flow chart of an unstructured road boundary detection method according to one embodiment.

FIG. 1 illustrates a schematic flow chart of an unstructured road boundary detection method S10 according to one embodiment.

Referring to FIG. 1, in S101, obtaining a color image. In some embodiments, the color image may be captured by a camera mounted on a vehicle.

Figure 2:
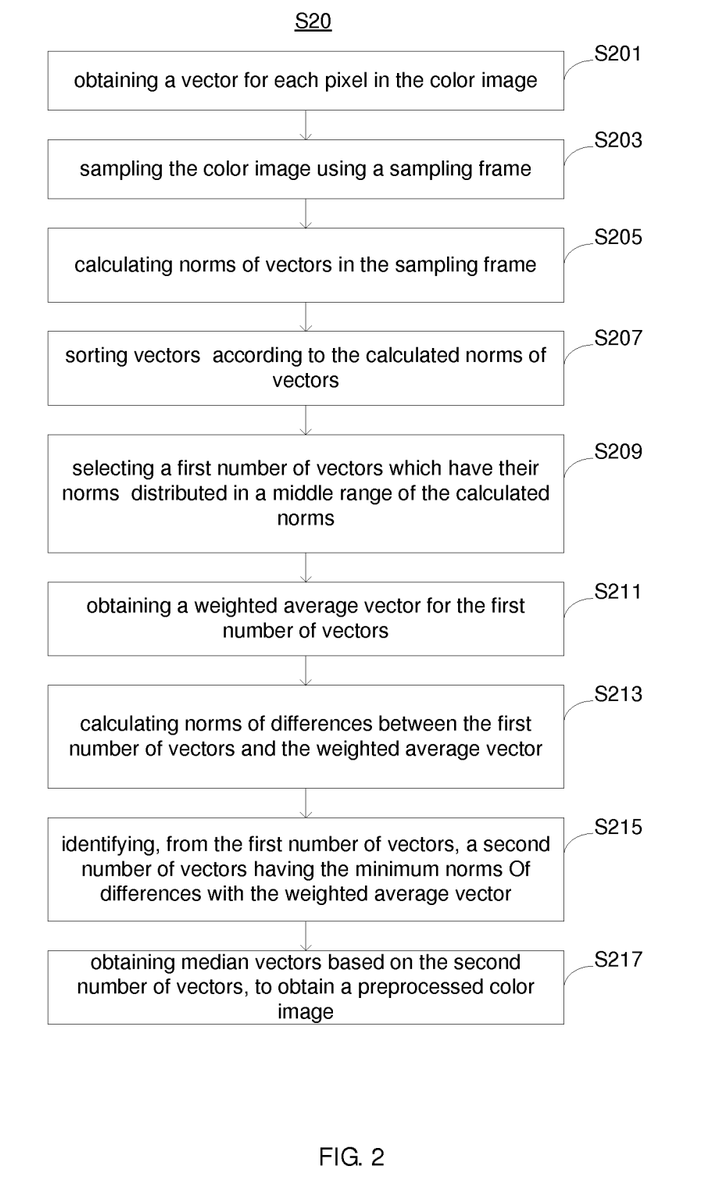
FIG. 2 illustrates a schematic flow chart of an image processing method according to one embodiment.

In S102, preprocessing the color image to suppress noise pixels' effect. Generally, the captured image tends to be affected by noise, such as speckle noise, and/or salt-and-pepper noise, which may adversely influence subsequent image feature identification. Filtering, typically a vector median filtering algorithm, may be used to remove those noise pixels from the color image. In some embodiments, an image processing method S20 may be used to suppress noise pixels' effect, which is illustrated in FIG. 2.

In S201, obtaining a vector for each pixel in the color image. A vector may correspond to a pixel, where the vector represents a line pointing from an original point to a point corresponding to the pixel in a color space. Generally, the captured color image may be constructed in a red-green-blue (RGB) color space. And, a vector of a corresponding pixel may be obtained in the RGB color space, which may include components representing color information of its corresponding pixel, such as red, green and blue. The original point may have its components all equal to zero.

In S203, sampling the color image using a sampling frame. In some embodiments, the captured color image may be sampled interlacedly, for example, only even rows and even columns are sampled. A "sampling frame" (also known as a sliding window) may be used to repeatedly apply the image processing method to pixels within the sampling frame as the sampling frame moves. The sampling frame may move across the color image in both vertical and horizontal directions, such as from the top-left corner of the color image to the bottom-right corner of the color image. Such a sampling frame may have a predetermined size (m×n), for example a size of 3×3, 7×7 or 11×11, where m and n may be an odd number greater than 1. In this embodiment, a set of N vectors may be sampled in the sampling frame.

A conventional vector median filtering algorithm may be used to preprocess vectors of the color image to suppress noises. However, the conventional vector median filtering algorithm may take a large amount of computation. In some embodiments, an improved image processing method is provided, which may greatly reduce complexity of computations.

In S205, calculating norms of vectors in the sampling frame.

In some embodiments, the norm $S_i$ of a vector $v_i$ may be calculated by equation (1):

$$S_i = \|v_i\| = \left(\sum_{j=1}^{m} |r_j|^2\right)^{1/2}, \quad (i = 1, 2, \ldots, N) \quad \text{Equation (1)}$$

where $r_j$ represents a $j^{th}$ component of a vector $v_i$, and m represents the number of components.

In S207, sorting vectors according to the calculated norms of vectors. The sampled vectors may be sorted in an ascending or descending order.

In S209, selecting a first number of vectors which have their norms distributed in a middle range of the calculated norms.

As the norm of a vector represents a distance to an original point in the coordination system in an Euclidean space, vectors having their norms distributed in a middle range of the calculated norms represent points in middle positions to the original point in the color space. That is, vectors having too large or too small norms are filtered out, which is reasonable because those are very possibly originated from noise pixels. Specifically, a first number t1 of vectors may be obtained by filtering out a number of vectors having the maximum norms and a number of vectors having the minimum norms, so as to form a new set of t1 vectors. The value of t1 is important for filtering noise and reducing computation complexity, which may be adjusted according to the characteristics of the noise and computation requirements. For a sampling frame having a size of 3×3, the value of t1 may be set in a range of 5 to 7.

In S211, obtaining a weighted average vector for the first number of vectors. In some embodiments, a $m^{th}$ component of the weighted average vector may be obtained by calculating weighted average of $m^{th}$ components of the first number of vectors.

In some embodiments, a weighted average of a component may be calculated by equation (2):

$$r_i = \frac{1}{N_w} \sum_{j=1}^{t} w_j r_{i,j} \quad \text{Equation (2)}$$

where $N_w$ may be given by equation (3):

$$N_w = \sum_{j=1}^{t} w_j \quad \text{Equation (3)}$$

where $r_i$ represents a weighted average of the $i^{th}$ component, $w_j$ represents a weight value for the $j^{th}$ vector within the t1 set, and $r_{i,j}$ represents the $i^{th}$ component of the $j^{th}$ vector. In some embodiments, the value of $w_j$ may be a reciprocal of a distance between a pixel corresponding to the $j^{th}$ vector and the central position of the sampling frame. Generally, the closer to the central position of the sampling frame, the greater the value of $w_j$. When a sampling frame having a smaller size is selected, the value of $w_j$ may be set to 1.

Thereafter, a weighted average vector $V_w = \{r_1, r_2, \ldots, r_m\}$ may be obtained, where $r_1$, $r_2$, and $r_m$ represents a weighted average of each component of the vector, which may be calculated according to the equation (2), and m represents the number of components of the weighted average vector.

In S213, calculating norms of differences between the first number of vectors and the weighted average vector.

In S215, identifying, from the first number of vectors, a second number of vectors having the minimum norms of differences with the weighted average vector.

Based on the calculated results in S213, a second number t2 of vectors having the minimum norms of differences with the weighted average vector may be identified from the set of t1 vectors, so as to form a new set of t2 vectors. The value of t2 is also important for filtering noise and reduction of computations complexity. For a sampling frame having a size of 3×3, the value of t2 may be set in a range of 3 to 5. A greater value of t2 may facilitate for suppressing white Gaussian noises, and a smaller value of t2 may facilitate for suppressing impulse noises.

In S217, obtaining median vectors based on the second number of vectors, to obtain a preprocessed color image.

In some embodiments, a traditional vector median filtering algorithm may be applied to the set of t2 vectors to obtain a median vector. By using the image processing method described above, the amount of computation can be reduced greatly.

In S103, converting the preprocessed color image from a RGB color space into a HSI color space.

HSI color space describes color pixels in terms of hue, saturation and illumination/brightness. Comparing with RGB color space, HSI color space relates more closely to the colors of human perception so that it is more intuitive to process and analyse image. Further, HSI color space is insensitive of light intensity variations, which may improve the data processing speed.

In some embodiments, the conversion from a RGB color space into a HSI color space may be obtained according to equations (4) to (7):

$$\theta' = \arccos\left\{ \frac{\frac{1}{2}[(R-G)+(R-B)]}{[(R-G)^2+(R-G)(G-B)]^{1/2}} \right\} \quad \text{Equation (4)}$$

$$H = \begin{cases} \theta' & B \leq G \\ 360 - \theta' & B > G \end{cases} \quad \text{Equation (5)}$$

$$S = 1 - \frac{3}{(R+G+B)}[\min(R, G, B)] \quad \text{Equation (6)}$$

$$I = \frac{1}{3}(R+G+B) \quad \text{Equation (7)}$$

where $\theta'$ represents an intermediate variable, R, G and B represent respectively brightness values of the three colors of red, green and blue in the RGB color space, and H, S and I represent respectively values of hue, saturation and brightness in the HSI color space.

Figure 3:
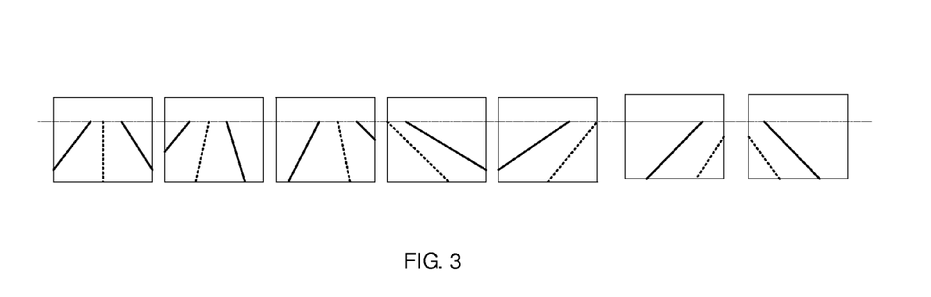
FIG. 3 schematically illustrates seven road models for road segmentation according to one embodiment.

In S105, selecting one road model within a plurality of candidate road models;

In some embodiments, seven candidate road models shown in FIG. 3 may be used for road segmentation. Road model includes most common road shape and may be used to predict next road region or boundary information. In some embodiments, a near regional road straight line model may be used to establish a model-based road boundary detection algorithm. The use of this model is mainly base on: first, the straight line model is simple and owns less computation, which can effectively improve real-time performance of the detection method; second, the road boundary is approximately a straight line limited in near region, and the near region is a decision region of Intelligent Vehicle driving.

In S106, selecting a candidate road region in the preprocessed color image according to the selected road model's boundary;

A candidate road region is selected to perform regional growth and segmentation. In some embodiments, the candidate region may have its boundary wider than the left and right road boundaries of the selected road model, respectively.

In S107, identifying a seed pixel from the candidate road region;

In some embodiments, the seed pixel may be obtained from a bottom and middle region of the preprocessed color image. The seed pixel may be deemed as belonging to a road region, because the bottom and middle region in the color image is generally road region closest to the vehicle in a real environment.

Figure 4:
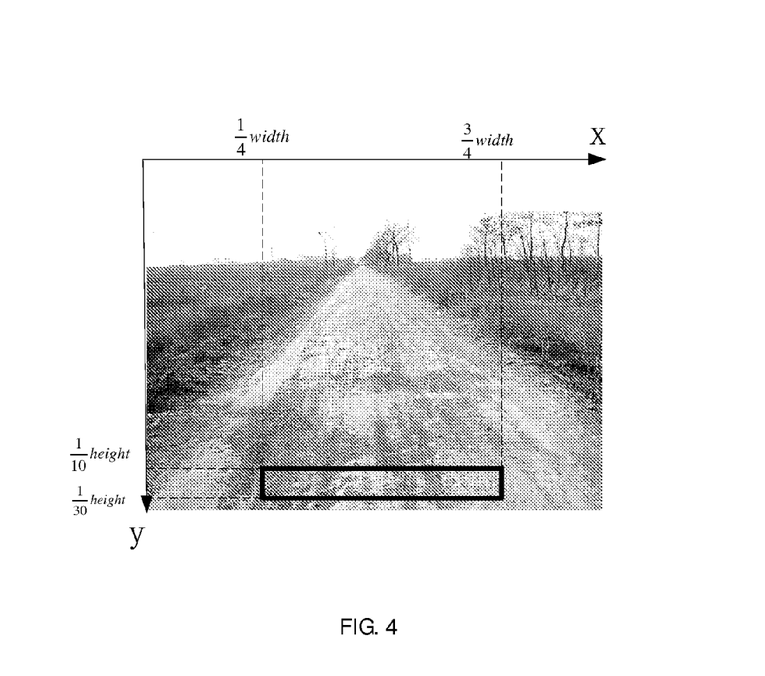
FIG. 4 schematically illustrates a region of the color image in which region a seed pixel is identified according to one embodiment.

FIG. 4 schematically illustrates a region of the color image in which region a seed pixel is identified, which is illustrated in a rectangle. Assuming that the color image after being preprocessed has a height equal to 1, and a width equal to 1, where the height and width define the image in pixels. In some embodiments, referring to FIG. 4, the rectangle may have 1/15 height and 1/2 width, where its bottom side is about 1/30 height from the image bottom, its top side is about 1/10 height from the image bottom, its left side is about 1/4 width from the image left side, and its right side is about 3/4 width from the image left side.

Then, a number N' of pixels in the region may be selected randomly as candidate seed pixels. In some embodiments, the number N' may be an integer from 5 to 10. The seed pixel may be obtained based on the selected candidate seed pixels by the following equations (8)~(12):

$$C'_i = \sum_{t=1}^{N'} S_t \cdot \cos(H_t) \quad \text{Equation (8)}$$

$$S'_i = \sum_{t=1}^{N'} S_t \cdot \sin(H_t) \quad \text{Equation (9)}$$

$$H_i = \arctan\left(\frac{S'_i}{C'_i}\right) \quad \text{Equation (10)}$$

$$S_i = \frac{1}{N'}\sqrt{(C'_i)^2 + (S'_i)^2} \quad \text{Equation (11)}$$

$$I_i = \frac{1}{N'}\sum_{t=1}^{N'} I_t \quad \text{Equation (12)}$$

where N' represents the number of candidate seed pixels selected in the bottom region; $S_t'$, $C_t'$ are intermediate variables, respectively; $H_t$, $S_t$, and $I_t$ represent values of hue, saturation and brightness of a pixel t in the number N' pixels, respectively; and, $H_i$, $S_i$ and $I_i$ represent values of hue, saturation and brightness of a seed pixel i, respectively.

In S109, calculating a brightness threshold and a color threshold in the candidate road region, the brightness threshold and color threshold are related to mean distances between pixels in the candidate region;

The mean square distance between pixels in the candidate road region and the seed pixel i may be calculated by the following equations (13) and (14):

$$d_{chrom-rms-i} = \sqrt{\frac{1}{M}\sum_{j=1}^{M} d_{jchrom-i}^2} \qquad \text{Equation (13)}$$

$$d_{int-rms-i} = \sqrt{\frac{1}{M}\sum_{j=1}^{M} d_{jint-i}^2} \qquad \text{Equation (14)}$$

where M represents the number of pixels in the candidate road region; $d_{jchrom-i}$ represents a color distance between a pixel j and the seed pixel $i(H_i, S_i, I_i)$, $d_{jint-i}$ represents an absolute value of a brightness distance between the pixel j and the seed pixel $i(H_i, S_i, I_i)$; $d_{chrom-rms-i}$ represents the root-mean-square value of the color distance between M pixels and the seed pixel, and $d_{int-rms-i}$ represents the root-mean-square value of the brightness distance between M pixels and the seed pixel.

Then, the threshold for road segmentation on a certain time point T, for example, T=0, may be obtained by the following equations:

$$T_{chrom}(0) = K d_{chrom-rms-i} \qquad \text{Equation (15)}$$

$$T_{achrom}(0) = K d_{int-rms-i} \qquad \text{Equation (16)}$$

where K represents an empirical parameter, $T_{achrom}(0)$ represents a brightness threshold, and $T_{chrom}(0)$ represents a color threshold.

In S111, performing road regional growth and segmentation to the candidate road region based on the brightness threshold and the color threshold;

Then, by calculating a distance between a pixel within the candidate road region and the seed pixel i ($H_i$, $S_i$, $I_i$), and comparing with the brightness and color thresholds, the road regional growth may be performed to the candidate road region.

In HSI color space, the hue of a pixel may be unclear when its brightness is very high or low; further, the hue of a pixel may be unstable when its saturation is very low. Therefore, pixels in the image may be classified into pixels with dim color which may have brightness very high (e.g., I>90) or very low (e.g., I<10) or saturation very low (e.g., S<10), and pixels with bright color (pixels not included in dim regions). So when performing road regional growth, only brightness may be considered for pixels with dim color, and the three components H, S and I of the HSI color space should be all considered for pixels with bright color. In some embodiments, the dim color pixels' values of saturation S and brightness I may be normalized to [0, 100].

In some embodiments, for pixels with dim color, if a brightness distance between a pixel j and the seed pixel i is less than a brightness threshold, the pixel j is classified into a road region, which may be expressed as in equation (17):

$$|I_i - I_j| < T_{achrom} \qquad \text{Equation (17)}$$

where $T_{achrom}$ represents a brightness threshold, which may be obtained by the equation (16).

Figure 5:
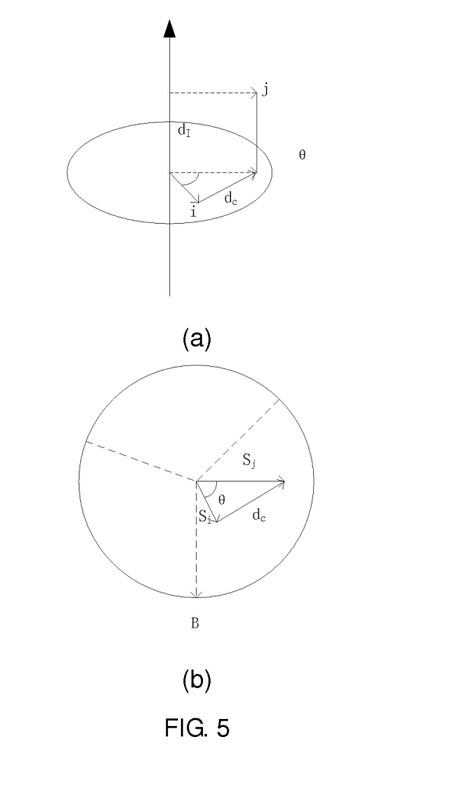
FIG. 5 schematically illustrates a distance between two pixels in the HSI color space.

Referring to FIG. 5, for pixels with bright color, a spatial distance between a pixel j and a seed pixel i may be calculated using the HSI color cylinder according to equations (18) to (21):

$$d(i, j) = \sqrt{(d_I)^2 + (d_c)^2} \qquad \text{Equation (18)}$$

$$d_I = |I_i - I_j| \qquad \text{Equation (19)}$$

$$d_c = \sqrt{(S_i)^2 + (S_j)^2 - 2 S_i S_j \cos\theta} \qquad \text{Equation (20)}$$

$$\theta = \begin{cases} |H_i - H_j| & \text{if } |H_i - H_j| < 180° \\ 360° - |H_i - H_j| & \text{if } |H_i - H_j| > 180° \end{cases} \qquad \text{Equation (21)}$$

where d(i, j) represents a spatial distance between a pixel j and the seed pixel i; $d_c$ represents a color distance between the pixel j and the seed pixel i in a two-dimensional color plane; $d_I$ represents the absolute value of a brightness distance between the pixel j and the seed pixel i; and $\theta$ represents a tone difference of the pixel j and the seed pixel i in the color plane.

In some embodiments, if d(i, j) is less than a color threshold $T_{chrom}$, the pixel j may be classified into the road region, where $T_{chrom}$ may be obtained by the equation (15).

With respect to pixels with dim color which do not meet equation (17), and pixels with bright color which do not meet the condition that their d(i, j) are greater than or equal to the color threshold, they are not classified into the road region. That is, those pixels are classified into non-road region. By doing this, all pixels in the road candidate region are segmented into road region and non-road region.

In S113, determining whether the selected road model matches an unstructured road;

An unstructured road may be captured in the color image. After the road segmentation in S111, a road segmentation result of the candidate road region is obtained. In some embodiments, to determine whether the selected road model matches the unstructured road, a matching degree of the selected road model with the unstructured road in the image may be calculated.

In some embodiments, a percentage of the number of pixels in a region according to the road segmentation result coinciding with pixies in corresponding region in the color image, within the number of all pixels in the corresponding region in the color image may be calculated. In some embodiments, the coincidence of pixels means that one pixel may have its values of hue, saturation and brightness substantially equal to another pixel. If the percentage is greater than a predetermined value, the selected road model is determined to match the actual unstructured road. In some embodiments, the predetermined value may be in a range from 85% to 90%.

If the road model does not match the unstructured road, the method goes to S105, a next road model within the seven road models is then tested, till a road model matching the unstructured road is determined.

In S115, estimating the unstructured road's boundary using a Kalman filter.

Based on the road segmentation, a boundary of the unstructured road may be obtained for the first time. Then a Kalman filter may be used to estimate the boundary of the unstructured road and its center line of the boundary in following color images, by tracking the previous calculation results. Assuming that there are $N_k$ pixels ($x_{k,j}$, $y_{k,j}$)

(i=1, 2, ... $N_k$) on the boundaries of the road segmentation result at a time point k, the estimating equation of the Kalman filter may include:

update and forecast:

$$\hat{Z}_k = H_k \hat{X}_{k,k-1} = H_k \hat{X}_{k-1} \quad \text{Equation (22)}$$

update state error covariance:

$$P_k = [I - K_k H_k] P_{k,k-1} \quad \text{Equation (23)}$$
$$= [I - P_{k,k-1} H_k^T [H_k P_{k,k-1} H_k^T + R_k]^{-1} H_k] P_{k,k-1}$$
$$= [I - P_{k,k-1} H_k^T [H_k P_{k-1} H_k^T]^{-1} H_k] P_{k-1}$$

update state estimation:

$$\hat{X}_k = \hat{X}_{k,k-1} + K_k [Z_k - H_k \hat{X}_{k,k-1}] \quad \text{Equation (24)}$$
$$= \hat{X}_{k-1} + K_k [Z_k - \hat{Z}_k]$$
$$= \hat{X}_{k-1} + P_{k-1} H_k^T [H_k P_{k-1} H_k^T]^{-1} [Z_k - \hat{Z}_k]$$

where $$Z_k = \begin{bmatrix} y_{k,1} \\ y_{k,2} \\ \ldots \\ y_{k,N_k} \end{bmatrix} \quad H_k = \begin{bmatrix} 1 & x_{k,1} \\ 1 & x_{k,2} \\ \ldots & \ldots \\ 1 & x_{k,N_k} \end{bmatrix} \quad \hat{X}_{k-1} = \begin{bmatrix} b \\ a \end{bmatrix}$$

where $X_{k-1}$ represents a state estimation of the detection algorithm in the previous loop, and $P_{k-1}$ represents a state error covariance of the detection algorithm in the previous loop. The state estimation of this disclosure means left and/or right boundary of the unstructured road. Specifically, with the knowledge of the left and/or right boundaries of the road segmentation result of the previous loop, and knowledge of the values of pixels on the boundaries currently, an estimation of left and/or right boundaries of the current loop can be obtained.

In some embodiments, after an estimated boundary of the unstructured road in a first color image is obtained, a percentage of the number of pixels in a region according to the estimation coinciding with pixies in a corresponding region in the color image, within the number of all pixels in the corresponding region in the color image may be calculated. If the percentage is greater than a predetermined value, e.g., 85%, the method goes to S115 to estimate the unstructured road's boundary in a second color image following the first image. That is, the road model which is determined previously still matches the actual unstructured road. Otherwise, the method goes to select a new road model matching the unstructured road.

It should be noted that the seed pixel required for regional growth should be updated in real-time, in order to reflect changes in road appearance and brightness. The updated seed pixel may still be calculated based on a plurality of candidate seed pixels which are selected randomly from a bottom region of a color image.

Further, as the seed pixel needs to be updated in time, the brightness threshold $T_{achrom}$ and the color threshold $T_{chrom}$ are also needs to be updated to perform regional growth, which may be expressed as $T_{chrom}(t)$ and $T_{achrom}(t)$.

Assuming that, after a road segmentation at a first time point (t), there are a number $N_p$ of vectors within a road region which is defined according to the previous road segmentation result of the first time point. So, a brightness threshold and a color threshold of a first time point (t+1), expressed as $T_{chrom}(t+1)$ and $T_{achrom}(t+1)$ may be obtained by the following equations:

$$d'_{chrom-rms-i} = \sqrt{\frac{1}{N_p} \sum_{j=1}^{N_p} d'^2_{jchrom-i}} \quad \text{Equation (25)}$$

$$d'_{int-rms-i} = \sqrt{\frac{1}{N_p} \sum_{j=1}^{N_p} d'^2_{jint-i}} \quad \text{Equation (26)}$$

$$T_{chrom}(t+1) = K d'_{chrom-rms-i} \quad \text{Equation (27)}$$

$$T_{achrom}(t+1) = K d'_{jint-i} \quad \text{Equation (28)}$$

where $d'_{jchrom-i}$ represents a color distance between a pixel j and a seed pixel which may have its component values differed from that obtained at the first time point, and $d'_{jint-i}$ represents an absolute value of a brightness distance between the pixel j and the seed pixel; $d'_{chrom-rms-i}$ represents the root-mean-square value of the color distance between $N_p$ pixels and the seed pixel, and $d'_{int-rms-i}$ represents the root-mean-square value of the brightness distance between $N_p$ pixels and the seed pixel; where the pixel j belongs to the number Np of vectors.

In one embodiment, a system for detecting an unstructured road boundary is provided. The system may be mounted on a vehicle. In some embodiments, the system may include: a camera for obtaining a color image; a storing device for storing a plurality of candidate road models; and a processing device configured to select in the storing device a road model for an unstructured road; identify a seed pixel from the candidate road region; obtain a brightness threshold and a color threshold, where the brightness threshold and the color threshold are determined according to brightness distances and color distances from pixels in a candidate road region to the seed pixel; perform road segmentation by determining whether the pixels in the candidate road region belong to a road region based on the brightness threshold and the color threshold; determine whether the road model matches the unstructured road based on the road segmentation result; and estimate the unstructured road's boundary if the road model matches the unstructured road.

In some embodiments, based on candidate road models stored in the storing device, the processing device may be configured to perform S101 to S115 and S201 to S217, to detect a road boundary of a color image captured by the camera.

The above embodiments provide a real-time and effective unstructured road boundary detection method based on the HSI color space. Further, by using an improved vector median filtering method, the amount of computation can be reduced greatly.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for detecting a road region, comprising:
obtaining, via a storage device, a color image;
selecting a candidate road region within the color image according to a road model;
identifying a seed pixel from the candidate road region;
determining, via a processing device, a brightness threshold and a color threshold according to brightness distances and color distances from pixels in the candidate road region to the seed pixel; and
determining that the pixels in the candidate road region belong to the road region based on the brightness threshold and the color threshold.

2. The method according to claim 1, further comprising preprocessing the color image, by:
sampling the color image using a sampling frame that has a predetermined height and a predetermined width;
calculating norms of vectors, which respectively correspond to pixels in the sampling frame, where each of the vectors represents a line pointing from an original point to a point corresponding to a pixel in a color space;
identifying a first predetermined number of vectors by filtering out a first number of vectors having maximum norms of vectors and a second number of vectors having minimum norms of vectors;
obtaining a weighted average vector, where an $m^{th}$ component of the weighted average vector is obtained by calculating weighted average of $m^{th}$ components of the first predetermined number of vectors;
calculating norms of differences between the first predetermined number of vectors and the weighted average vector;
identifying, from the first predetermined number of vectors, a second predetermined number of vectors having minimum norms of differences with the weighted average vector; and
obtaining median vectors based on the second predetermined number of vectors to obtain a preprocessed color image, where the candidate road region is selected within the preprocessed color image.

3. The method according to claim 2, where a weight value for an $m^{th}$ component of the first predetermined number of vectors is determined based on a distance between a pixel corresponding to the $m^{th}$ component of the first predetermined number of vectors and a center position of the sampling frame.

4. The method according to claim 1, wherein a brightness threshold $T_{achrom}$ and a color threshold $T_{chrom}$ are obtained, respectively, as follows:

$$d_{chrom-rms-i} = \sqrt{\frac{1}{M}\sum_{j=1}^{M} d_{jchrom-i}^2}$$

$$d_{int-rms-i} = \sqrt{\frac{1}{M}\sum_{j=1}^{M} d_{jint-i}^2}$$

$$T_{chrom} = Kd_{chrom-rms-i}$$

$$T_{achrom} = Kd_{int-rms-i}$$

where M represents the number of pixels in the candidate road region; $d_{jchrom-i}$ represents a color distance between a pixel j and the seed pixel, $d_{jint-i}$ represents an absolute value of a brightness distance between a pixel j and the seed pixel; $d_{chrom-rms-i}$ represents the root-mean-square value of a color distance between M pixels and the seed pixel, $d_{int-rms-i}$ represents the root-mean-square value of a brightness distance between M pixels and the seed pixel, and K represents an empirical parameter.

5. The method according to claim 4, where determining that the pixels in the candidate road region belong to a road region comprises:
obtaining a spatial distance between a pixel of bright color and the seed pixel;
comparing the spatial distance with the color threshold; and
determining whether the pixel of bright color belongs to a road region based on the comparison;
where the spatial distance between the pixel and the seed pixel is calculated as follows:

$$d(i, j) = \sqrt{(d_I)^2 + (d_c)^2}$$

$$d_I = |I_i - I_j|$$

$$d_c = \sqrt{(S_i)^2 + (S_j)^2 - 2S_iS_j\cos\theta}$$

$$\theta = \begin{cases} |H_i - H_j| & \text{if } |H_i - H_j| < 180° \\ 360° - |H_i - H_j| & \text{if } |H_i - H_j| > 180° \end{cases}$$

where d(i, j) represents a spatial distance between a pixel j and the seed pixel i; $d_c$ represents a color distance between the pixel j and the seed pixel i in a two-dimensional color plane; $d_I$ represents the absolute value of a brightness distance between the pixel j and the seed pixel i; and θ represents a tone difference between the pixel j and the seed pixel i in the color plane; $H_i$ and $H_j$ represent hue components of the seed pixel i and the pixel j in HSI color space, respectively; $S_i$ and $S_j$ represent saturation components of the seed pixel i and the pixel j in HSI color space, respectively; and $I_i$ and $I_j$ represent brightness components of the seed pixel i and the pixel j in HSI color space, respectively.

6. The method according to claim 4, wherein determining that the pixels in the candidate road region belong to a road region comprises:
obtaining a brightness distance between a pixel of dim color and the seed pixel;
comparing the brightness distance with the brightness threshold; and
determining whether the pixel of dim color belongs to a road region according to the comparison;
where the brightness distance between the pixel j of dim color and the seed pixel i is calculated as follows:
$d_i = I_i - I_j$; and
$I_i$ and $I_j$ represent brightness components of the seed pixel i and the pixel j in HSI color space, respectively.

7. The method according to claim 1, further comprising determining whether the road model matches an unstructured road which is included in the color image based on a road segmentation result.

8. The method according to claim 7, wherein determining whether the road model matches the unstructured road based on the road segmentation result comprises:
calculating a percentage of pixels in a region determined according to the road segmentation result coinciding with pixels in a corresponding region in a color image; and
if the percentage is greater than a predetermined value, determining that the selected road model matches the unstructured road.

9. A system for detecting a road region, comprising:
a camera for obtaining a color image; and
a processing device configured to:
select a candidate road region within the color image according to a road model;
identify a seed pixel from the candidate road region;
determine a brightness threshold and a color threshold according to brightness distances and color distances from pixels in the candidate road region to the seed pixel; and
perform road segmentation by determining that the pixels in the candidate road region belong to the road region based on the brightness threshold and the color threshold.

10. The system according to claim 9, wherein the processing device is further configured to:
sample the color image using a sampling frame that has a predetermined height and a predetermined width;
calculate norms of vectors, which respectively correspond to pixels in the sampling frame, where each of the vectors represents a line pointing from an original point to a point corresponding to a pixel in a color space;
identify a first predetermined number of vectors by filtering out a first number of vectors having maximum norms of vectors and a second number of vectors having minimum norms of vectors;
obtain a weighted average vector, where an $m^{th}$ component of the weighted average vector is obtained by calculating weighted average of $m^{th}$ components of the first predetermined number of vectors;
calculate norms of differences between the first predetermined number of vectors and the weighted average vector;
identify, from the first predetermined number of vectors, a second predetermined number of vectors having minimum norms of differences with the weighted average vector; and
obtain median vectors based on the second predetermined number of vectors to obtain a preprocessed color image, where the candidate road region is selected within the preprocessed color image.

11. The system according to claim 10, where a weight value for an $m^{th}$ component of the first predetermined number of vectors is determined based on a distance between a pixel corresponding to the $m^{th}$ component of the first predetermined number of vectors and a center position of the sampling frame.

12. The system according to claim 9, wherein a brightness threshold $T_{achrom}$ and a color threshold $T_{chrom}$ are obtained, respectively, as follows:

$$d_{chrom-rms-i} = \sqrt{\frac{1}{M}\sum_{j=1}^{M} d^2_{jchrom-i}}$$

$$d_{int-rms-i} = \sqrt{\frac{1}{M}\sum_{j=1}^{M} d^2_{jint-i}}$$

$$T_{chrom} = K d_{chrom-rms-i}$$

$$T_{achrom} = K d_{int-rms-i}$$

where M represents the number of pixels in the candidate road region; $d_{jchrom-i}$ represents a color distance between a pixel j and the seed pixel, $d_{jint-i}$ represents an absolute value of a brightness distance between a pixel j and the seed pixel; $d_{chrom-rms-i}$ represents the root-mean-square value of a color distance between M pixels and the seed pixel, $d_{int-rms-i}$ represents the root-mean-square value of a brightness distance between M pixels and the seed pixel, and K represents an empirical parameter.

13. The system according to claim 12, where for determining whether a pixel j with bright color belongs to a road region, the processing device is further configured to:
obtain a spatial distance between a pixel of bright color and the seed pixel;
compare the spatial distance with the color threshold; and
determine whether the pixel of bright color belongs to a road region based on the comparison;
where the spatial distance between the pixel and the seed pixel is calculated as follows:

$$d(i, j) = \sqrt{(d_I)^2 + (d_c)^2}$$

$$d_I = |I_i - I_j|$$

$$d_c = \sqrt{(S_i)^2 + (S_j)^2 - 2S_i S_j \cos\theta}$$

$$\theta = \begin{cases} |H_i - H_j| & \text{if } |H_i - H_j| < 180° \\ 360° - |H_i - H_j| & \text{if } |H_i - H_j| > 180° \end{cases}$$

where $d(i, j)$ represents a spatial distance between a pixel j and the seed pixel i; $d_c$ represents a color distance between the pixel j and the seed pixel i in a two-dimensional color plane; $d_I$ represents the absolute value of a brightness distance between the pixel j and the seed pixel i; and $\theta$ represents a tone difference between the pixel j and the seed pixel i in the color plane; $H_i$ and $H_j$ represent hue components of the seed pixel i and the pixel j in HSI color space, respectively; $S_i$ and $S_j$ represent saturation components of the seed pixel i and the pixel j in HSI color space, respectively; and $I_i$ and $I_j$ represent brightness components of the seed pixel i and the pixel j in HSI color space, respectively.

14. The system according to claim 12, where for determining whether a pixel j with dim color belongs to a road region, the processing device is further configured to:
obtain a brightness distance between a pixel of dim color and the seed pixel;
compare the brightness distance with the brightness threshold; and
determine whether the pixel of dim color belongs to a road region according to the comparison;
where the brightness distance between the pixel j of dim color and the seed pixel i is calculated as follows:
$d_i = I_i - I_j$; and $I_i$ and $I_j$ represent brightness components of the seed pixel i and the pixel j in HSI color space, respectively.

15. The system according to claim 9, wherein the processing device is further configured to determine whether the road model matches an unstructured road which is included in the color image based on a road segmentation result.

16. The system according to claim 15, wherein determining whether the road model matches the unstructured road based on the road segmentation result, the processing device is further configured to:
- calculate a percentage of pixels in a region determined according to the road segmentation result coinciding with pixels in a corresponding region in a color image; and
- if the percentage is greater than a predetermined value, determining that the selected road model matches the unstructured road.

* * * * *